(12) United States Patent
Newton

(10) Patent No.: X7399
(45) Date of Patent: Jan. 31, 1833

(54) CLAPBOARDS, MACHINE

(76) Inventor: Daniel Newton

Daniel. Newton
Letters. Patent

The Schedule referred to in these Letters Patent, and making part of the same,
containing a description in the words of the said Daniel Newton himself of his
improvement in the construction of a Clapboard Machine.
To all to whom these presents shall come: . . Be it known that I Daniel Newton
of Dalton in the County of Coos & State of Newhampshire have invented a new & useful
improvement in the construction of a Clapboard Machine, & the following is a full &
exact description of the construction & operation of the said Machine as invented or
improved by me. . . . . First, a frame is made 26 feet long & 5 feet wide, the timbers
of the frame about 7 or 8 inches square & the legs one foot in length. The legs of the forward
end of said machine (that is the end towards which the saw [illegible] must be put on to the
end of the timbers of the frame & come about 8 inches above the frame for the carriage
to strike against when it runs back. . . On the side opposite to the saws & prefix-
ed to the timber of the frame is a board 14 feet in length, & about 6 inches in width, the
side upwards. . At the forward end of this board on the side of the leg is prefixed two
small pieces of timber one inch ½ thick, 7 inches long & two inches wide, hanging by an
iron or wooden pin passing thro' 2½ inches from the top of them, so the weight of them
below the pin, being the greatest, will keep them perpendicular; the top of them must come
as high as the top of the carriage & about 1½ inch between them . . . On the top of this
board to the end of it in a line against the center of these small pieces of timber, hanging per-
pendicular, is a piece of timber 2½ inches at the forward end 1½ inch at the other & [illegible] long 1
inch thick at the widest end, beginning at the middle of the thickness on each side a line
is drawn straight to the center where it meets at the distance of about 9 or 10 inches; the wood
must be taken off to these lines; & from the point where these two lines meet the remainder
of the stick, one & a half inch in width, the narrow end of this stick must be made nearly in
the same form, beginning on the sides as above directed & running to the center where they meet
about six inches from the end & between these two points, the timber is cut, [illegible] the thickness
it is at the ends. This is hung by a pin passing thro' it & the board on which it lays at the dis-
tance of 7 inches from the widest end. . . . On the frame or platform before described running
the whole length thereof & on the middle of the timbers are pieces of cast iron ⅜ of an inch thick, on .

the under side 3/4 of an inch wide & running almost to an edge on the upper side with small
bars across on the under side 3 inches long within 3 feet of each other thro' which screws are put
to hold the iron on to the timbers. . On this platform is a carriage 13 feet long & is made in the fol-
lowing manner. The sides & ends are to be timbers about 5 inches square, they may be blocked to-
gether by cutting ½ into each, about 6 inches from the ends of the side pieces & beginning on the
end of the cross pieces, which are next to the saw & from the end of the cross pieces on the other side
must be left about 6 inches projecting over from the side; into which is cut at each end of the
carriage two grooves 1 inch ½ inch wide & 3/4 of an inch deep, & into these grooves are placed two pieces of
timber about one inch & a quarter square & 13 feet long, placed in such a form that they will
come regular against those pieces of timber hanging perpendicular at the forward end of the carriage.
At the hindermost end of the carriage on the under side of the 6 inches which projects over of the cross
piece & in the centre of the same, is prefixed the end of a timber about 1½ inch thick 2½ wide & the
length must be exactly to reach; when the carriage is run back against the forward end) to those
small pieces of timber which hang perpendicular at the forward end of the carriage against
which the end of it strikes the lower end of them alternately by drawing over the piece of timber on the
board at the forward end of the carriage. On each end of the carriage prefixed to the cross pieces about
16 inches from the side opposite to the saw is a post bolted onto the end of the carriage, & about 4 inches
square; on these two posts is hung a shaft about 13 feet long which must be straight exactly &
ought to be turned: this shaft ought to be at least 4 inches in diameter. . On this shaft over the
center of the cross pieces at each end of the carriage is a wheel of cast iron about 10 inches in diameter
completely encircled with cogs; between these wheels & on the side of the shaft opposite to the saw are sus-
pended two weights supposed to weigh about 30 lb each, they ought to be as near the ends of the shaft as
they can to prevent springing it. . On the forward end of the shaft is a crank which by turning
the head block is drawn back under these two cast iron wheels, two pieces of cast iron are placed which
are called gauges, they must be about 4 feet long, 1 inch wide & 3/8 thick with notches on the side & cogs
on the top, which match into those on the shaft over them & the ends of these gauges next to the saw are fas-
tened to the head block, a piece of timber about 12½ feet long & three inches square. . Under this head block
are two pieces of timber about 3 inches by 5 which run square across the carriage, which are let down into
the side pieces of the carriage about an inch, the piece of timber, which is to the hindermost end of the
carriage is to be about one foot from the cross piece of the end, the other is about 8 feet from this towards
the forward end of the carriage; on the end of these timbers next to the saw & about 2 feet in length must
be placed small trundles of cast iron or pieces of polished iron or steel; this is what the plank lays on
while sawing into clapboards & it is very important to have it move as easy as possible.

On the head block are two dogs, one fastened nearly to the end of it in the near part of the carriage;
& the other is in a mortise 6 feet long & 3/4 of an inch wide, so [illegible] it can be moved to saw from 8 to
12 feet; on one end of these dogs is a screw & a nut thereon. . . On the side of the carriage next to
the saws & under the cross pieces about 7 inches is pieces of cast iron to the length of 14 feet which is
called the rack & which must be completely fastened to the carriage. . . This rack ought to be
about 1 inch square including the cogs, with which it is to be lined on the under side. The gauges of
which one end is fastened to the head block, lay on the center of the cross pieces at each end of the car-
riage, exactly under the wheels of cast iron on the shaft which meshes into them & the cogs
on the wheels & gauges must correspond exactly with each other. . The notches on the side of
the gauges are 1 inch & 1/2 of an inch long & these two pieces of timber which are on the 6 inches that
projects over the carriage have grooves cut into them 1/8 of an inch deep, thro which the gauges [illegible]
& one side is cut standing in such a manner that they will fay into the notches of the gauges. .
At the forward end of the carriage & to these two pieces of timber on the under side of each, is attached
a wire spring one end of it is fastened to them, & the other to the cross piece of the carriage which
springs keep them in the notches of the gauges. . On the inside of these two pieces of timber at each
end of each one is prefixed a spring made of large wire or steel for the purpose of moving these
timbers into the next notch of the gauges alternately. These two pieces of timber hanging perpen-
dicular at the forward end of the carriage, the board on the side of the frame the piece of timber
on the board, the piece attached to the hindermost end of the carriage which draws over the piece
on the board & these two pieces with springs prefixed to them are on the same principle exactly
of Earl's Patent on a Shingle Machine with this one exception, there is an addition of 4 springs,
which moves them alternately into the next notch of the gauges. . . On the side of this frame on
which the carriage runs & about 4 feet in length & beginning about 10 feet from the forward end
of the carriage is a frame about 20 inches wide on which is hung 2 circular saws; about 32 inches in
diameter is large enough to be profitable: one hangs in a perpendicular form & the other inclining on
the side 1/2 of an inch, to every 6 inches of the diameter of the saw, the shafts or arbors on which cir-
cular saws are hung are too well known to need a description, the collars on these shafts ought
to be about 6 inches in diameter. These two saws hang in the following position, one is directly
forward of the other, excepting it is moved by the other 1/2 an inch, which is the hindermost one & they
must be 1/2 an inch apart at the top of the collars & the tip of the .... saw before described will
bring them 1/2 of an inch apart, 6 inches above the collars; which will leave the clapboard [illegible] of
an inch in thickness; or both saws may hang perpendicular, one 1/2 an inch by the other & saw both edges.

of a thickness by having another pair of gauges to put in on account of its taking more time
to saw both edges of a thickness. On the outside of each saw near the hindermost edge is a piece of
iron or steel to which when the end of the clapboard comes it springs it off from the saws to
prevent their heating the one for the forward saw must be equally behind it & near to the edge of
it. . . The pulleys on these shafts, to which the saws are hung, must not be one equally forward
of the other but be the other a little more, than the width of one to prevent the belts which are around
the pulleys from interfering with each other. . . These belts are to be around the pulleys & around a
drum underneath the floor on which the Machine stands which drum is turned by water or
some other power & puts the machine in operation. . . . Near the forward end of this small
frame on which the saws hang is a shaft of wrought iron which passes thro' the same & just under
the pieces of iron on which the carriage runs. . . On the end of this shaft is a cast iron wheel
about 1½ inch in diameter, which mashes into the rack, & and by which the carriage is drawn
up; around this end of the shaft is a spring which would be glad to keep the cogs on this small
wheel out of place on the rack; but this end of the shaft, every time the carriage runs back
is raised ¼ of an inch by a loop of iron or steel in the hindermost end of the carriage, which
comes under the spring around the shaft & raises it on to a notch in a piece of iron, where
it remains until it is moved off the same, which operation is performed by one or more pieces
of iron fastened to the carriage & fixed in such a manner that they will move it off the notch
when either of them comes against it; these pieces of iron may be hung in the center & a pin
to alter from one side of them to the other so that any one of them may be used at any
time according to the length of the plank which is sawing; there ought to be 5. beginning
at 8 & ending at 12 feet. . . Near the other end of this shaft which moves the carriage is a
wheel of cast iron about 10 inches in diameter & encircled with cogs into which a small wheel
of cast iron mashes 1½ inch in diameter, which turns it round & thereby moves the carriage;
this small wheel is on a shaft about ¾ of an inch square, & on the other end of the shaft is
a pulley around which there is a band from a pulley on the shaft, on which the forward
saw is hung & by the saws turning the whole machine is put in operation. . In the center
of the cross piece at the hindermost end of the carriage is fastened a rope which runs
half way to the forward end of the carriage, and goes thro the floor over a trundle
at the end of which a weight is tied of suitable heft to run the carriage back or it
may be run back by gearing. .

Witnesses. James Walker — Daniel Newton
" Henry Bacon (2510 words)

[illegible]